(12) United States Patent
Lee et al.

(10) Patent No.: US 12,229,969 B2
(45) Date of Patent: Feb. 18, 2025

(54) METHOD AND OPTICAL MOTION SENSOR CAPABLE OF IDENTIFYING FALSE MOTION

(71) Applicant: PixArt Imaging Inc., Hsin-Chu (TW)

(72) Inventors: Joon Chok Lee, Penang (MY); Kevin Len-Li Lim, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 420 days.

(21) Appl. No.: 17/865,405

(22) Filed: Jul. 15, 2022

(65) Prior Publication Data
US 2024/0020850 A1    Jan. 18, 2024

(51) Int. Cl.
*G06K 9/00* (2022.01)
*G06T 7/13* (2017.01)
*G06T 7/20* (2017.01)
*G06V 10/75* (2022.01)
*G08B 29/18* (2006.01)

(52) U.S. Cl.
CPC ............ *G06T 7/20* (2013.01); *G06T 7/13* (2017.01); *G06V 10/751* (2022.01); *G08B 29/185* (2013.01)

(58) Field of Classification Search
CPC ............ G06T 7/20; G06T 7/13; G06T 7/254; G06V 10/751; G06V 10/16; G08B 29/185; G08B 13/19604
See application file for complete search history.

(56) References Cited

FOREIGN PATENT DOCUMENTS

| CN | 1471691 A | * | 1/2004 | ............ G06T 5/002 |
|---|---|---|---|---|
| CN | 1672402 A | * | 9/2005 | ............ G06T 5/003 |
| CN | 100370485 C | * | 2/2008 | ............ G06T 5/002 |
| CN | 100512390 C | * | 7/2009 | ............ G06T 5/003 |
| CN | 101615296 A | * | 12/2009 | ............ G06T 7/254 |

\* cited by examiner

*Primary Examiner* — Xin Jia
(74) *Attorney, Agent, or Firm* — Winston Hsu (57) ABSTRACT

A method of identifying a false alarm of an optical motion sensor including a plurality of pixel units, includes: receiving pixel values of a testing set of pixel units selected from the plurality of pixel units, and a number of pixels of the testing set is smaller than a number of the plurality of pixel units; and performing a background adjustment operation according to the pixel values of the testing set of pixel units.

5 Claims, 5 Drawing Sheets

METHOD AND OPTICAL MOTION SENSOR CAPABLE OF IDENTIFYING FALSE MOTION

BACKGROUND OF THE INVENTION

1. Field of the Invention

The invention relates to an optical sensor mechanism, and more particularly to an optical motion sensor and a corresponding method.

2. Description of the Prior Art

Generally speaking, a conventional optical motion sensor detects a motion by comparing a current image frame with a reference or background image pixel by pixel. The conventional optical motion sensor usually uses a pixel difference threshold for each pixel that defines the level of difference between current and background frame. A pixel is considered different when the difference becomes greater than said pixel difference threshold. However, an abrupt light illumination change will result in a false positive (false motion) result. Examples for the abrupt changes in illumination include room lights switching on/off, blinds/curtains being opened/closed, sunlight drift due to cloud movement and so on. In other words, the performance of the conventional optical motion sensor is easily affected by the abrupt light illumination change.

SUMMARY OF THE INVENTION

Therefore one of the objectives of the invention is to provide an optical motion sensor and a corresponding method, to solve the above-mentioned problems.

According to embodiments of the invention, a method of identifying a false alarm of an optical motion sensor is disclosed. The optical motion sensor includes a sensor circuit including a pixel array having a plurality of pixel units to output pixel values corresponding to the plurality of pixel units. The method comprises: receiving pixel values of a testing set of pixel units selected from the plurality of pixel units, and a number of pixels of the testing set is smaller than a number of the plurality of pixel units; and, performing a background adjustment operation according to the pixel values of the testing set of pixel units.

According to the embodiments, an optical motion sensor is disclosed. The optical motion sensor comprises a sensor circuit and a processing circuit. The sensor circuit has a pixel array having a plurality of pixel units to output pixel values corresponding to the plurality of pixel units. The processing circuit is coupled to the sensor circuit, and it is configured for receiving pixel values of a testing set of pixel units selected from the plurality of pixel units, the testing set of pixel units comprising multiple neighboring pixel units. In addition, for the testing set of pixel units: the processing circuit is arranged for calculating a short-term average of the pixel values of the testing set in N image frames, calculating a long-term average of the pixel values of the testing set in M image frames, M being larger than N, and generating a preliminary alert signal to perform a background adjustment operation when a variance between the short-term average and the long-term average is larger than a variance threshold.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution of an optical motion sensor and corresponding method capable of more accurately sensing or detecting a false motion/alarm of its sensor circuit, which may be caused due to the abrupt change of light illumination or other factors and is not associated with a true motion, by performing a specific pixel test operation upon at least one portion/set of pixel values comprised by frame/image data generated by the sensor circuit of the optical motion sensor.

The at least one portion/set of pixel values are pixel values of at least one portion/set of pixel units at corresponding spatial positions in different image frames. The specific pixel test operation is performed to calculate at least one variance of pixel data in the different image frames so as to determine whether a false motion occurs.

In one embodiment, the at least one portion/set of pixel values for example (but not limited) are selected from the pixel values positioned or located at the boundary/corners/edges of the frame/image data, i.e. the pixel values of corresponding pixel units located at the boundary/corners/edges of a pixel array, and the detection of abrupt illumination change is achieved by using and executing a testing operation which is performed upon the selected pixel values and will be described later.

Figure 1:
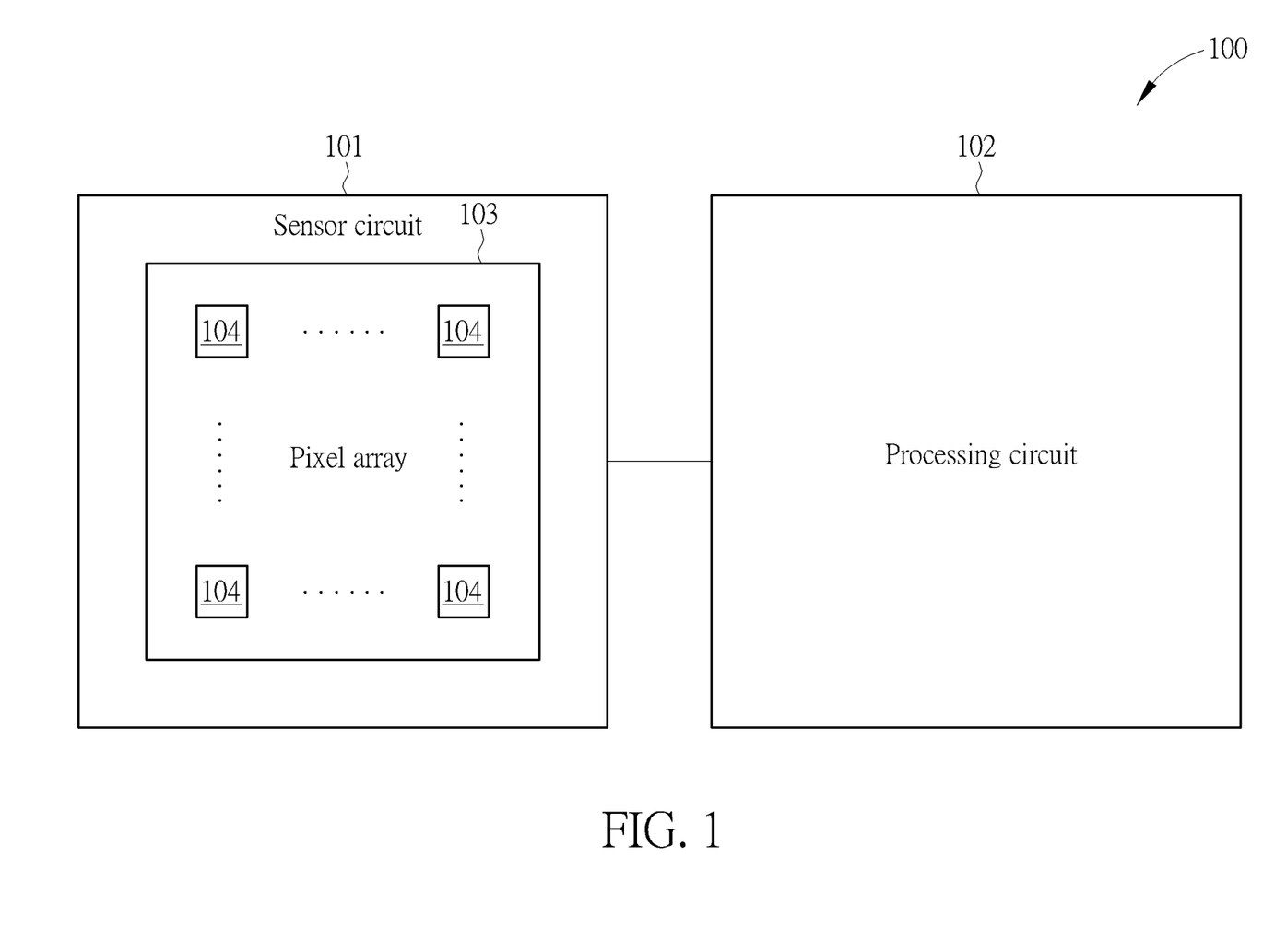
FIG. 1 is a block diagram of an optical motion sensor according to an embodiment of the invention.

FIG. 1 is a block diagram of an optical motion sensor 100 according to an embodiment of the invention. The optical motion sensor 100 comprises a sensor circuit 101 and a processing circuit 102. The sensor circuit 101 comprises a pixel array 103 which includes a plurality of pixel units 104 (e.g. 28×28 pixels (but not limited)) and is arranged to generate a plurality of pixel values of the pixel units 104 at consecutive and different timings or time slots to generate image frames. For example (but not limited), one or each generated image frame comprises pixel values respectively corresponding to the 28×28 pixel units 104 at a time slot, and is transmitted to the processing circuit 102 which is externally coupled to the pixel array 103 (or the sensor circuit 101).

The optical motion sensor 100 can be also used to detect whether a motion (or true motion) occurs in the generated image frame(s), i.e. detecting whether a true motion event occurs in its generated image frame(s) or in its field of view. The optical motion sensor 100 compares a generated image frame with a background image to determine whether a motion occurs, wherein the background image frame is generated or updated periodically based on the generated image frame(s). In addition, For example (but not limited), the optical motion sensor 100 can detect a motion by detecting the brightness change (e.g. variance of pixel differences) between a capturing image and a background image to determine whether a motion event occurs, and also can determine whether the motion is a false alarm motion by detecting the brightness change of one or more testing sets of pixel units in a plurality of consecutive capturing images to determine whether the brightness change between the capturing image and the background image is caused by an abrupt change of an environment light or light condition. For example, the optical motion sensor 100 may compare a background image with a specific image frame and determining a motion occurs when a pixel difference between pixel values of the background image and pixel values of the specific image exceeds a pixel difference threshold, wherein the background image is updated periodically based on at least one image frame.

If it is determined that the brightness change is caused by the abrupt change of the environment light or light condition, the optical motion sensor 100 can determine that the detected motion is a false alarm motion.

For example, a motion (or motion event) is generated from the sensor circuit 101, and the optical motion sensor 100 is capable of identifying a false alarm motion generated from the sensor circuit 101. In practice, the processing circuit 102 can identify a false alarm event by identifying the false motion, and an alarm signal is not triggered and not transmitted to a backend system when an alarm event is determined as a false alarm event by the processing circuit 102.

In practice, for performing the testing operation, the processing circuit 102 is arranged for receiving a plurality of image frames from the sensor circuit 101 and for determining at least one portion of pixel values of at least one testing set of the pixel units in each of the received image frames as at least one testing set of edge pixel values; pixel values of a testing set/testing set of edge pixel units can be referred to as edge pixel values.

Then, the processing circuit 102 detects the variances of sum/average of the edge pixel values in different image frames to determine whether an abrupt illumination change occurs so as to identify a false motion/alarm. For example, when the trend of the variances becomes higher than a specific threshold (i.e. variance threshold), the processing circuit 102 determines that an abrupt illumination change occurs and a corresponding motion is determined as a false motion. When the trend of the variances does not become higher than the specific threshold, the processing circuit 102 determines that no abrupt illumination changes occur and a corresponding motion may be determined as a true motion.

Figure 2:
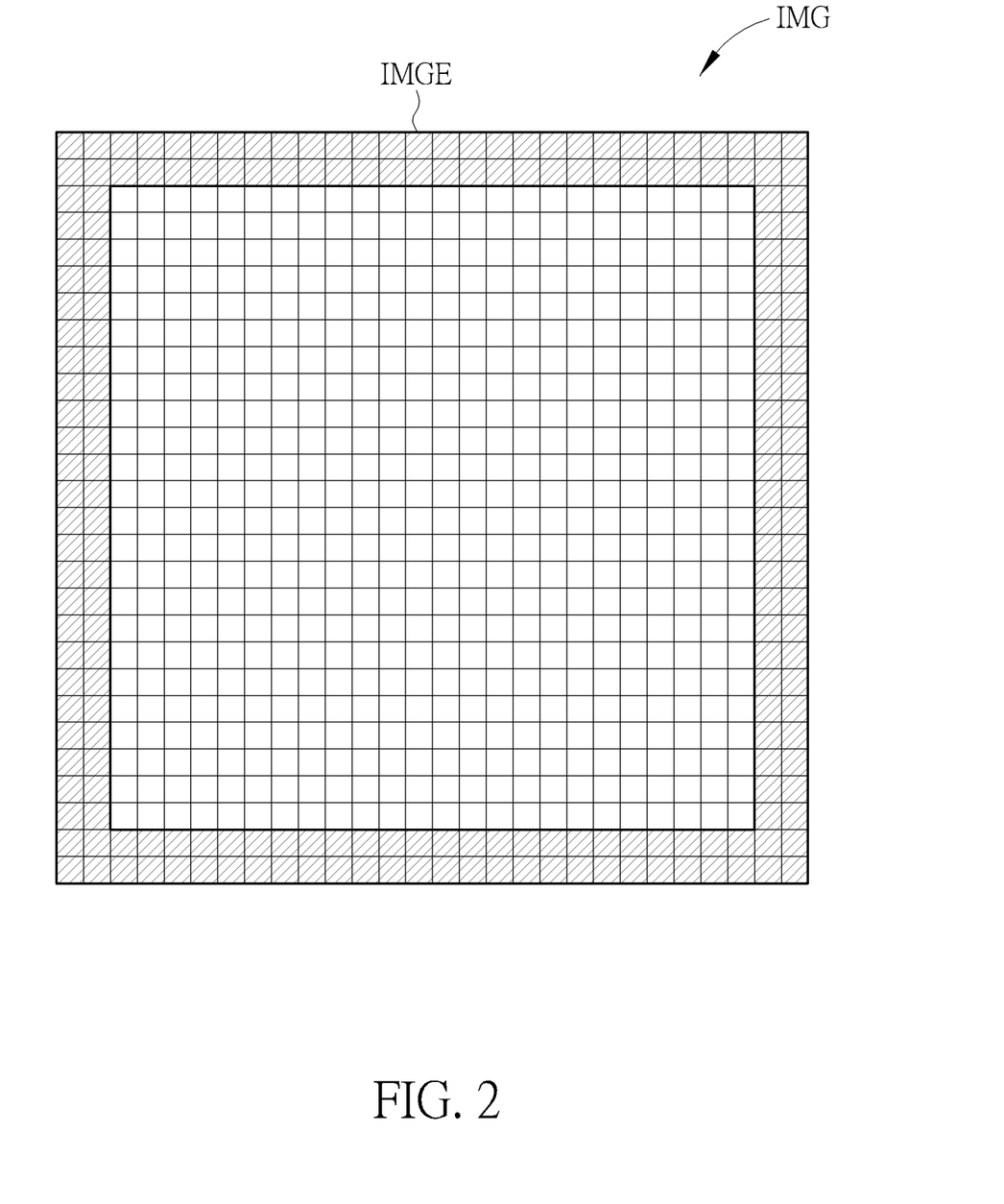
FIG. 2 is a diagram showing an example of the boundary IMGE of an image frame IMG formed by image frames/values according to an embodiment of the invention.

FIG. 2 is a diagram showing an example of the boundary IMGE of an image frame IMG formed by 28×28 image frames/values according to an embodiment of the invention. For example (but not limited), the width of the boundary IMGE may be equal to the two-pixel distance, and the boundary IMGE surrounds the other pixel values of the image frame IMG. The processing circuit 102 may select at least one portion of pixel values from the pixel values of the boundary IMGE as edge pixel values or may select all the pixel values of the boundary IMGE as edge pixel values if the computation resource is available.

For example, the processing circuit 102 may receive pixel values of at least one testing set of pixel units selected from the plurality of pixel units 104 wherein a testing set of pixel units comprise neighboring pixel units. To decrease computing loading, all pixel units in one testing set are neighbored.

Once the processing circuit 102 identifies a motion in a current image, for a testing set of pixel units, the processing circuit 102 calculates a short-term average of the testing set in the past N image frames (including the current image), calculates a long-term average of the testing set in the past M image frames (including the current image) wherein M is larger than N, and generates a preliminary alert signal to perform a background adjustment operation according to the pixel values of the testing set of pixel units (e.g. when a variance between the short-term average and long-term average is larger than the variance threshold). For example, the processing circuit 102 may select multiple testing sets of pixel units from the plurality of pixel units, e.g. K testing sets of pixel units, to calculate multiple short-term averages and multiple long-term averages of the K testing sets of pixel units respectively in N image frames and M image frames. In practice, equivalently, the processing circuit 102 receives pixel values of the K testing sets of pixel units from the boundary IMGE of the image frame IMG as multiple testing sets of edge pixel values to provide or generate K pixel data sets for the image frame; a pixel data set comprises a testing set of edge pixel values. The processing circuit 102 can also provide different K pixel data sets for each of multiple different image frames. That is, the processing circuit 102 generates K pixel data sets for a first image frame and generates different K pixel data sets for a second image frame different from the first image frame; for example, the second image frame may follow the first image frame. In addition, K is an integer equal to or greater than two (but not limited). One or each pixel data set is generated from L1 pixel values corresponding to L2 pixel units and the L2 pixel units may be neighboring or non-adjacent. K, L2, and L1 may be identical, different, or partially different integers which are equal to two or greater than two; however, this is not intended to be a limitation.

Figure 3:
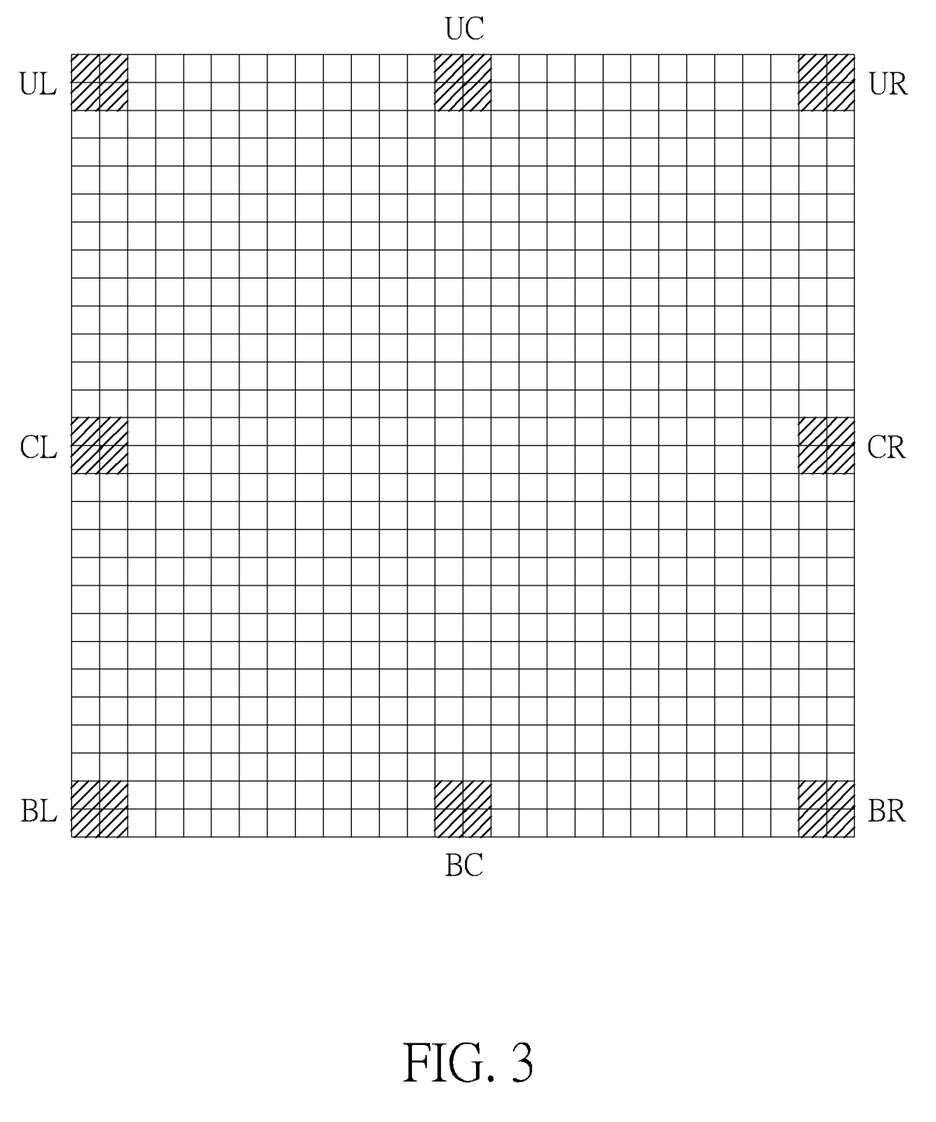
FIG. 3 is a diagram showing an example of the eight testing sets of edge pixel values (i.e. eight pixel data sets) selected from the boundary IMGE of the image frame IMG according to an embodiment of the invention.

FIG. 3 is a diagram showing an example of the eight testing sets of edge pixel values (i.e. eight pixel data sets) selected from the boundary IMGE of the image frame IMG according to an embodiment of the invention. In FIG. 3, the processing circuit 102 equivalently selects eight testing sets of pixel units from all the pixel units of the boundary IMGE as eight testing sets of edge pixel units. For instance, the selected eight testing sets of edge pixel units may be respectively formed by multiple neighboring pixel units such as two-by-two pixel units (but not limited), and may be respectively located at different spatial positions, e.g. at the upper-left corner, upper-center edge position, upper-right corner, left-center edge position, right-center edge position, bottom-left corner, bottom-center edge position, and the bottom-right corner. Thus, in FIG. 3, the processing circuit 102 determines the eight testing sets of edge pixel values (i.e. eight pixel data sets) from all the pixel values of the boundary IMGE, and each testing set of edge pixel values is formed by two-by-two pixel values (i.e. L1=L2=4) and the eight testing set of edge pixel values are respectively indicated by UL, UC, UR, CL, CR, BL, BC, and BR. Then, the processing circuit 102 determines whether a false alarm occurs or not based on the variances of the eight testing sets of test pixel values in different image frames (i.e. the variances of the eight pixel data sets in the different image frames). It should be noted that the edge pixel values are to be tested and may be referred to as test pixel values or pixel values of pixel units under test or to be tested. In one embodiment, a variance of a pixel data set means an image change of the pixel data set corresponding to the pixel units between at least one previous image frame and a current/next image frame. In one embodiment, the variance of the pixel data set may mean a short-term image change of the pixel data set and/or a long-term image change of the pixel data set.

In other embodiment, the width of the boundary may be different from the two-pixel distance, e.g. a three-pixel distance or a larger pixel distance. Further, in other embodiment, the number of a testing set of test pixel values, i.e. a size of the testing set, may be formed by three-by-three pixel values (i.e. L1=L2=9) different from the size of two-by-two pixel values. The size is not intended to be a limitation. The number of pixels of the testing set is smaller than the number of pixels of the pixel units comprised by the pixel array 103.

Further, in one embodiment, the number L1 of edge pixel values comprised in a pixel data set may be different from the number L2 of the pixel units. For example, a pixel data set may comprise the average(s), weighted average(s), or sum(s) generated from two or three pixel values selected from the four pixel units, and L1 is smaller than L2 which is equal to four. The selected pixel values may be associated with adjacent or non-adjacent pixel units in the boundary IMGE. That is, a pixel value in a pixel data set can be generated by the processing circuit 102 pixel by pixel and/or can be generated by calculating averages or sums of multiple pixel values. The modifications also fall within the scope of the invention.

Additionally, in other embodiment, each testing set may comprise at least one pixel unit disposed in the boundary region of the pixel array 103, and different testing sets comprise a portion of overlapped pixel units. An overlapped pixel unit indicates a pixel unit is classified into more testing sets. Additionally, in one embodiment, at least two testing sets respectively comprise different numbers of pixel units. All the modifications fall within the scope of the invention.

Further, in other embodiment, the numbers of different testing sets of test pixel values may be different. Further, in other embodiment, the number of the selected testing sets of test pixel values may be different, e.g. four testing sets of test pixel values at the corners of the image frame IMG; that is, the integer K is equal to 4 in this situation. Further, in other embodiment, the locations of the selected testing sets of test pixel values may be different and they are dependent upon the array size of the pixel array 103 and the amount of the computing resources that are available within the optical motion sensor 100 (or processing circuit 102).

Figure 4:
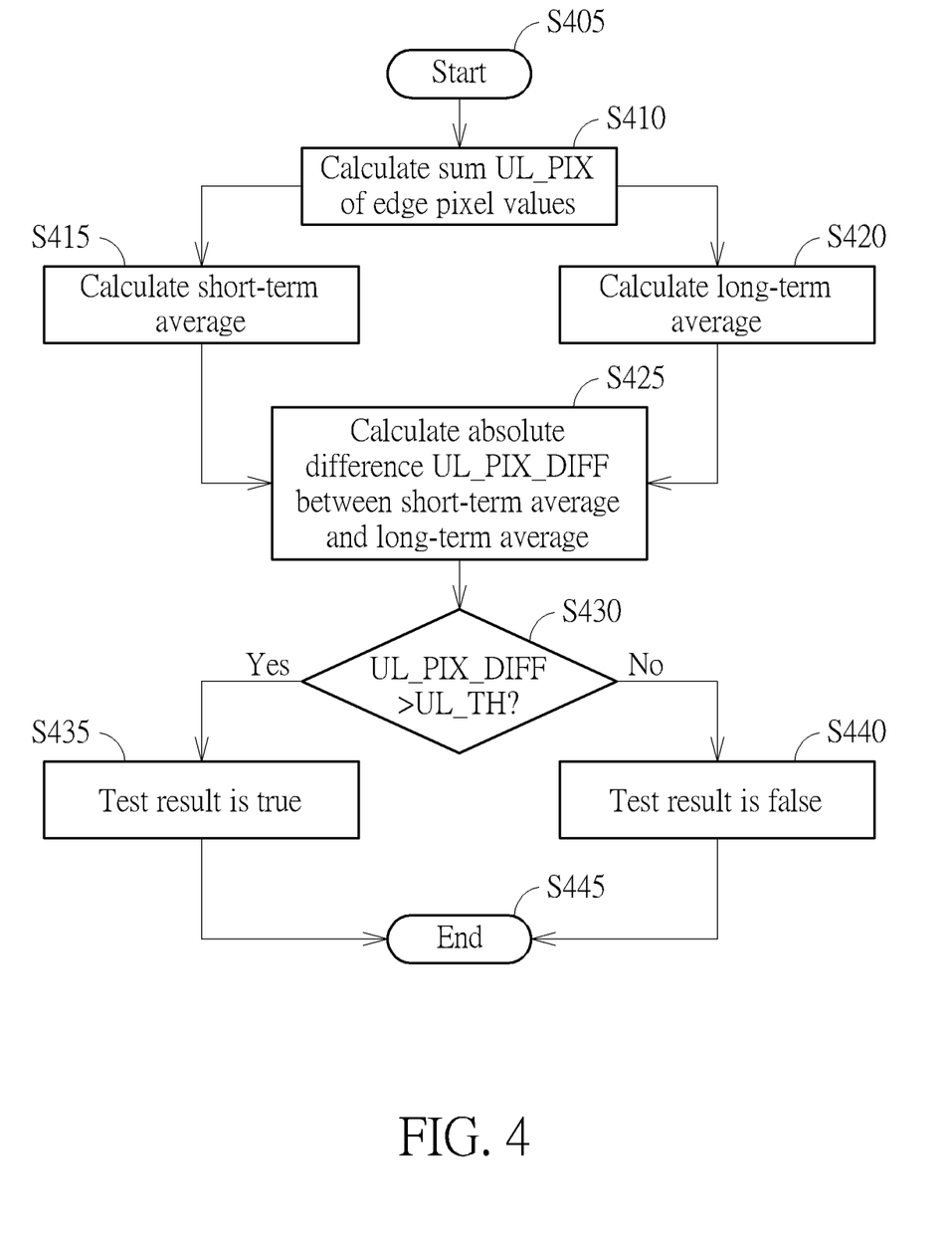
FIG. 4 is a flowchart diagram of the operations of the edge pixel statistics test operation performed upon a testing set of edge pixel values according to an embodiment of the invention.

In practice, the processing circuit 102 is arranged to perform the edge pixel statistics test operation upon each selected testing set of edge/test pixel values. FIG. 4 is a flowchart diagram of the operations of the edge pixel statistics test operation performed upon a testing set of edge pixel values according to an embodiment of the invention. In FIG. 4, the edge pixel statistics test operation for example is performed upon each selected testing set of test pixel values as shown in FIG. 3. For example (but not limited), the edge pixel statistics test operation for example is performed for the testing set UL of test pixel values at the upper-left corner; the edge pixel statistics test operation can be performed for the other testing sets of pixel values respectively. Provided that substantially the same result is achieved, the steps of the flowchart shown in FIG. 4 need not be in the exact order shown and need not be contiguous, that is, other steps can be intermediate. Steps are detailed in the following:

Step S405: Start;

Step S410: the processing circuit 102 performs a summation operation to calculate a sum UL_PIX of the pixel values in the testing set UL at the upper-left corner in a current image frame such as the frame IMG;

Step S415: the processing circuit 102 calculates a short-term average of pixel values;

Step S420: the processing circuit 102 calculates a long-term average of pixel values;

Step S425: the processing circuit 102 calculates an absolute difference UL_PIX_DIFF between the short-term average and the long-term average as a variance of pixel values in the testing set UL at the upper-left corner;

Step S430: the processing circuit 102 compares the calculated absolute difference UL_PIX_DIFF with a specific threshold value UL_TH (i.e. the variance threshold); if the calculated absolute difference UL_PIX_DIFF is greater than the specific threshold value UL_TH, the flow proceeds to Step S435 and the processing circuit 102 determines that the test result of the edge pixel statistics test operation performed for the testing set UL is true; otherwise, if the calculated absolute difference UL_PIX_DIFF is not greater than the specific threshold value UL_TH, the flow proceeds to Step S440 and the processing circuit 102 determines that the test result is false;

Step S435: the test result of the testing set UL is true;

Step S440: the test result of the testing set UL is false; and

Step S445: End.

In Step S415, the processing circuit 102 is arranged to calculate the short-term average of pixel values by the following equation:

$$\text{ST\_UL\_PIX}' = \frac{\text{UL\_PIX} + (N-1) \times \text{ST\_UL\_PIX}}{N}$$

wherein UL_PIX indicates the sum of the pixel values in the testing set UL at the upper-left corner in a current image frame such as the image frame IMG, N indicates N time slots corresponding to N image frames, ST_UL_PIX indicates an average of the sums of pixel values in the testing set UL at the upper-left corner in (N−1) previous image frames, and ST_UL_PIX' indicates the resultant short-term average of pixel values which is an average result of the sums of pixel values in the testing set UL at the upper-left corner in N different consecutive image frames. The initial value of ST_UL_PIX may be configured as zero.

Similarly, in Step S420, the processing circuit 102 is arranged to calculate the long-term average of pixel values by the following equation:

$$\text{LT\_UL\_PIX}' = \frac{\text{UL\_PIX} + (M-1) \times \text{LT\_UL\_PIX}}{M}$$

wherein UL_PIX indicates the sum of the pixel values in the testing set UL at the upper-left corner in a current image frame such as the image frame IMG, M indicates M time slots corresponding to M image frames, LT_UL_PIX indicates an average of the sums of pixel values in the testing set UL at the upper-left corner in (M−1) previous image frames, and LT_UL_PIX' indicates the long-term average of pixel values which is an average result of the sums of pixel values in the testing set UL at the upper-left corner in M different consecutive image frames. The initial value of LT_UL_PIX may be configured as zero. The integer M is greater than that of N. For example, the integer M can be equal to 64, and the integer N can be equal to 16; however, this is not intended to be a limitation.

In Step S425, the processing circuit 102 for example calculates the absolute difference UL_PIX_DIFF as a variance of pixel values in the testing set UL at the upper-left corner of the boundary IMGE in FIG. 2. If the absolute difference UL_PIX_DIFF is greater than the specific threshold value UL_TH, the processing circuit 102 determines an upper-left edge pixel test signal UL_PIX_TEST, i.e. the result of the edge pixel statistics test operation performed for the testing set UL, is true such as a bit '1'. If the absolute difference UL_PIX_DIFF is not greater than the specific threshold value UL_TH, the processing circuit 102 determines the upper-left edge pixel test signal UL_PIX_TEST is false such as a bit '0'.

Under a stable or slow light change illumination condition, both the short-term average ST_UL_PIX' and long-term average LT_UL_PIX' are expected to be closely match, and the absolute difference UL_PIX_DIFF is expected to be a smaller absolute difference value. In this situation, the absolute difference UL_PIX_DIFF is not greater than the specific threshold value UL_TH, and the processing circuit 102 can determine that a corresponding edge pixel test for the abrupt light change is false. Alternatively, under an abrupt change of illumination condition, the short-term average ST_UL_PIX' will record more pixel changes and faster than long-term average LT_UL_PIX', and thus the absolute difference UL_PIX_DIFF in this situation is expected to be a larger absolute difference value. Thus, when the absolute difference UL_PIX_DIFF is greater than the specific threshold value UL_TH, and the processing circuit 102 can determine that the corresponding edge pixel test for the abrupt light change is true.

Similarly, the processing circuit 102 can generate other different edge pixel test signals, e.g. UC_PIX_TEST, UR_PIX_TEST, CL_PIX_TEST, CR_PIX_TEST, BL_PIX_TEST, BC_PIX_TEST, and BR_PIX_TEST by respectively calculating the corresponding absolute differences at different edge locations and comparing the corresponding absolute differences with corresponding threshold values.

Figure 5:
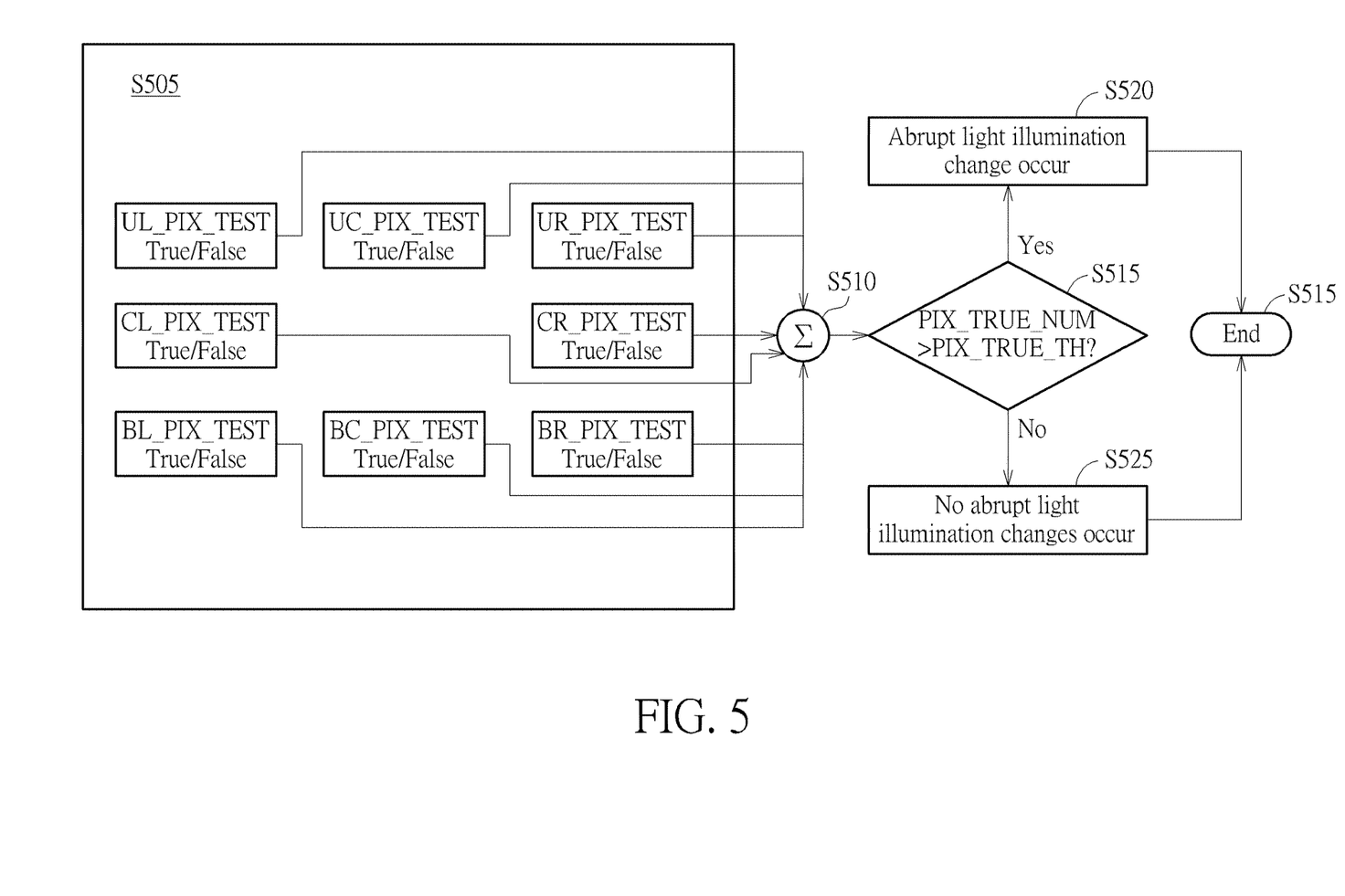
FIG. 5 is a flowchart diagram of the operations of the edge pixel statistics test operation performed upon multiple testing sets of edge pixel values according to an embodiment of the invention.

FIG. 5 is a flowchart diagram of the operations of the edge pixel statistics test operation performed upon multiple testing sets of edge pixel values according to an embodiment of the invention. Provided that substantially the same result is achieved, the steps of the flowchart shown in FIG. 4 need not be in the exact order shown and need not be contiguous, that is, other steps can be intermediate. As shown in FIG. 5, in Step S505, the processing circuit 102 generates multiple edge pixel test signals (which may be true or false), such as the upper-left edge pixel test signal UL_PIX_TEST, upper-center edge pixel test signal UC_PIX_TEST, upper-right edge pixel test signal UR_PIX_TEST, center-left edge pixel test signal CL_PIX_TEST, center-right edge pixel test signal CR_PIX_TEST, bottom-left edge pixel test signal BL_PIX_TEST, bottom-center edge pixel test signal BC_PIX_TEST, and the bottom-right edge pixel test signal BR_PIX_TEST.

In Step S510, the processing circuit 102 counts a total number of the edge pixel test signals that are true so as to generate a number PIX_TRUE_NUM, and then in Step S515 the processing circuit 102 compares the number PIX_TRUE_NUM with a number threshold value PIX_TRUE_TH. If the number PIX_TRUE_NUM is larger than the number threshold value PIX_TRUE_TH, then the flow proceeds to Step S520 and the processing circuit 102 determines that an abrupt illumination change occurs in the image frames. If the number PIX_TRUE_NUM is not larger than the number threshold value PIX_TRUE_TH, then the flow proceeds to Step S525 and the processing circuit 102 determines that no abrupt illumination changes occur in the image frames. For example (but not limited), the number threshold value PIX_TRUE_TH can be configured as half of the number of selected pixel testing sets, e.g. 4. When the number PIX_TRUE_NUM is equal to or larger than 5, the processing circuit 102 determines that an abrupt change of light illumination occurs. In the Step S530, the detection flow is finished, and the processing circuit 102 can be arranged to generate a preliminary alert signal to perform at least one kind of corresponding background adjustment operation if an abrupt illumination change occurs.

In one embodiment, when detecting that an abrupt illumination change occurs, the processing circuit 102 may be arranged to re-initialize or reconfigure a background image frame as a current image frame. This may effectively reduce the difference between current and background image frames and also shorten the duration where false motion is asserted.

In other embodiment, when detecting that an abrupt illumination change occurs, the processing circuit 102 may increase a background image update rate, and this can effectively shorten the time for a background image frame to match the current image frame and can also shorten the duration where false motion is asserted.

In other embodiment, when detecting that an abrupt illumination change occurs, the processing circuit 102 may increase at least one pixel difference threshold, which is/are used to be compared with the above calculated pixel difference(s), so as to effectively increase the tolerance of environment change. The different operations mentioned above are used for illustrative purposes, and are not intended to be limitations of the invention.

In other embodiment, the processing circuit 102 can perform the background adjustment operation to increase the pixel difference threshold for only partial pixel units in the pixel array 103 and is arranged to keep the pixel difference threshold for a specific portion of pixel units. For example, the partial pixel units have the pixel values which will be affected by the abrupt light illumination change, determined by the processing circuit 102, and for example they may use a pixel difference threshold which is identical to those used by the pixel units within a testing set that detects false motion); the other pixel units (i.e. the specific portion of pixel units) have the pixel values which will be not affected by the abrupt light illumination change, and for example they may use a pixel difference threshold which is identical to those used by the pixel units within a testing set that does not detect false motion). By doing so, after the light illumination change occurs, the optical motion sensor 100 can dynamically adjust the pixel difference thresholds for different portions of pixel units in the pixel array 103.

Further, in one embodiment, the number of testing sets of edge pixel values determined by the processing circuit 102 can be changed and different, and for example (but not limited) it can be equal to four. For example, the processing circuit 102 can randomly determine and select four testing sets of edge pixel values from the eight testing sets of edge pixel values shown in FIG. 3. For instance (but not limited), the processing circuit 102 may select the four testing sets UL, UR, BL, and BR at the four corners or may select the four testing sets UC, CL, BC, and CR at the four edges. Correspondingly, the number threshold value PIX_TRUE_TH is adjusted down to a smaller integer such as two or another different integer. By doing so, the processing circuit 102 (or the optical motion sensor 100) can reduce the computation complexity as well as effectively detecting the abrupt light change at the boundary of image frames.

Further, in one embodiment, a number of edge pixel values in a first selected testing set mentioned above may be different from a number of edge pixel values in a second selected testing set. For example, the edge pixel testing set UL may comprise four edge pixel value formed by two-by-two pixel units, and an edge pixel testing set may comprise only two edge pixel values, three edge pixel values, or a larger number of edge pixel values such as nine edge pixel values formed by three-by-three pixel units.

Further, it should be noted that the pixel statistics test operation may be performed upon non-edge pixel values to determine whether an abrupt light illumination change occurs. This modification also falls within the scope of the invention.

The edge pixel test signal (s) can be considered as preliminary alert signal(s) generated from the processing circuit 102. The processing circuit is used for summing at least one preliminary alert signal to obtain a number of alert events, and for performing a background adjustment operation when the number of alert events is larger than a specific number threshold such as PIX_TRUE_TH. The processing circuit 102 is arranged not to perform the background adjustment operation when the number of alert events is not larger than the specific number threshold.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of identifying a false alarm of an optical motion sensor including a sensor circuit including a pixel array having a plurality of pixel units to output pixel values corresponding to the plurality of pixel units, wherein the method comprises:
 receiving pixel values of a testing set of pixel units selected from the plurality of pixel units, and a number of pixels of the testing set is smaller than a number of the plurality of pixel units; and
 performing a background adjustment operation according to the pixel values of the testing set of pixel units.

2. The method of claim 1, further comprising:
 receiving pixel values of K testing sets of pixel units, and the K testing sets of pixel units being edge pixel units respectively disposed in a boundary portion of the pixel array.

3. The method of claim 2, wherein the K testing sets comprise at least one sets among a set of upper-left pixel units, a set of upper-center pixel units, a set of upper-right pixel units, a set of center-left pixel units, a set of center-right pixel units, a set of bottom-left pixel units, a set of bottom-center pixel units, and a set of bottom-right pixel units respectively disposed in a boundary portion of the pixel array.

4. The method of claim 1, wherein each testing set comprises at least one pixel unit disposed in a boundary region of the pixel array, and different testing sets comprise a portion of overlapped pixel units.

5. The method of claim 1, wherein at least two testing sets respectively comprise different numbers of pixel units.

* * * * *